United States Patent
Gopalakrishnan

(10) Patent No.: US 9,760,114 B1
(45) Date of Patent: Sep. 12, 2017

(54) SYSTEMS AND METHODS FOR IMPROVING CLOCK SYNCHRONIZATION BETWEEN MASTER AND SLAVE DEVICES

(71) Applicant: Juniper Networks, Inc., Sunnyvale, CA (US)

(72) Inventor: Kamatchi Soundaram Gopalakrishnan, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 314 days.

(21) Appl. No.: 14/146,830

(22) Filed: Jan. 3, 2014

(51) Int. Cl.
  *H04L 7/00* (2006.01)
  *H04B 17/00* (2015.01)
  *G06F 1/12* (2006.01)
  *G06F 15/16* (2006.01)

(52) U.S. Cl.
  CPC ..................................... *G06F 1/12* (2013.01)

(58) Field of Classification Search
  CPC ........ G06F 1/12; G06F 9/5077; G06F 9/5072; H04L 47/70
  USPC .................................................. 709/248, 206
  See application file for complete search history.

(56) References Cited

U.S. PATENT DOCUMENTS

| | | | | | |
|---|---|---|---|---|---|
| 5,257,010 | A | * | 10/1993 | Rehder | G08B 13/242 340/572.3 |
| 5,534,805 | A | * | 7/1996 | Miyazaki | G06F 1/10 327/144 |
| 8,416,763 | B1 | * | 4/2013 | Montini | H04J 3/0667 370/350 |
| 8,427,963 | B2 | * | 4/2013 | Zampetti | H04J 3/0641 370/242 |
| 8,892,708 | B2 | * | 11/2014 | Merrill | H04L 41/5041 709/223 |
| 8,954,609 | B1 | * | 2/2015 | Holleman | H04L 69/28 709/203 |
| 9,009,329 | B2 | * | 4/2015 | Malakapalli | H04L 67/08 709/204 |

(Continued)

OTHER PUBLICATIONS

Kamatchi Soundaram Gopalakrishnan; Systems and Methods for Improving Clock Synchronization Between Master and Slave Devices; U.S. Appl. No. 15/670,280, filed Aug. 7, 2017.

*Primary Examiner* — Kevin Bates
*Assistant Examiner* — Golman Mahmud
(74) *Attorney, Agent, or Firm* — FisherBroyles, LLP

(57) ABSTRACT

A computer-implemented method for improving clock synchronization between master and slave devices may include receiving at least one clock-synchronization packet transferred from a master device to a slave device via a network that supports an IP. The method may also include identifying at least one item of IP information added to the clock-synchronization packet during the transfer from the master device to the slave device. The method may further include determining that the clock-synchronization packet experienced a delay that exceeds a predetermined threshold during the transfer based at least in part on the item of IP information. Finally, the method may include discarding the clock-synchronization packet from a set of clock-synchronization packets capable of being used to synchronize the slave device with the master device in response to the determination. Various other methods, systems, and computer-readable media are also disclosed.

20 Claims, 7 Drawing Sheets

(56) References Cited

U.S. PATENT DOCUMENTS

| | | | | |
|---|---|---|---|---|
| 9,015,318 B1* | 4/2015 | Batz | ............... | H04L 12/14 709/217 |
| 2006/0020715 A1* | 1/2006 | Jungck | ............... | H04L 29/12066 709/246 |
| 2007/0116064 A1* | 5/2007 | Kim | ............... | H04J 3/0682 370/508 |
| 2010/0080249 A1* | 4/2010 | Li | ............... | H04J 3/0688 370/503 |
| 2011/0185216 A1* | 7/2011 | Zhao | ............... | G06F 1/14 713/401 |
| 2011/0228834 A1* | 9/2011 | Umayabashi | ............... | H03L 7/08 375/224 |
| 2012/0307845 A1* | 12/2012 | Le Pallec | ............... | H04J 3/14 370/503 |
| 2013/0155945 A1* | 6/2013 | Chen | ............... | H04J 3/0661 370/328 |
| 2013/0227008 A1* | 8/2013 | Yang | ............... | G06F 1/12 709/204 |
| 2013/0272322 A1* | 10/2013 | Sagarwala | ............... | H04J 3/0658 370/508 |
| 2014/0192826 A1* | 7/2014 | Zampetti | ............... | H04B 10/07 370/503 |
| 2014/0270805 A1* | 9/2014 | Mani | ............... | H04J 3/0667 398/155 |
| 2015/0229388 A1* | 8/2015 | Xu | ............... | H04B 10/071 398/29 |

\* cited by examiner

SYSTEMS AND METHODS FOR IMPROVING CLOCK SYNCHRONIZATION BETWEEN MASTER AND SLAVE DEVICES

BACKGROUND

Computer networks often include devices that synchronize their internal clocks. For example, a network may include a master device that sends various Precision Time Protocol (PTP) packets to a slave device. Some of these PTP packets may include a timestamp that identifies the particular point in time that the master device sent the PTP packets to the slave device. The slave device may collect the timestamps included in these PTP packets over a period of time sometimes referred to as a realignment interval. At the end of the realignment interval, the slave device may attempt to synchronize its clock with the clock of the master device based at least in part on these timestamps.

Unfortunately, some of these PTP packets may experience unexpected delays during the transfer from the master device to the slave device. For example, a Border Gateway Protocol (BGP) route injection attack may divert the route of certain PTP packets from a known network to an unknown network. This diversion may cause transfer delays that render the packets' timestamps unreliable and/or misleading (especially in the event that the known network supports transparent clocking, which accounts for the amount of time taken to pass through the network's routers, but the unknown network does not support transparent clocking). As a result, these diverted PTP packets may introduce a certain degree of inaccuracy into the slave device's synchronization attempt or even lead to further desynchronization between the master device and the slave device.

The instant disclosure, therefore, identifies and addresses a need for systems and methods for improving clock synchronization between master and slave devices.

SUMMARY

As will be described in greater detail below, the instant disclosure generally relates to systems and methods for improving clock synchronization between master and slave devices.

In one example, a computer-implemented method for improving clock synchronization between master and slave devices may include receiving at least one clock-synchronization packet transferred from a master device to a slave device via a network that supports an Internet Protocol (IP). The method may also include identifying at least one item of IP information added to the clock-synchronization packet during the transfer from the master device to the slave device. The method may further include determining that the clock-synchronization packet experienced a delay that exceeds a predetermined threshold during the transfer based at least in part on the item of IP information. Finally, the method may include discarding the clock-synchronization packet from a set of clock-synchronization packets capable of being used to synchronize the slave device with the master device in response to the determination.

As another example, a system for implementing the above-described method may include a reception module that receives at least one clock-synchronization packet transferred from a master device to a slave device via a network that supports an IP. The system may also include an identification module that identifies at least one item of IP information added to the clock-synchronization packet during the transfer from the master device to the slave device. The system may further include a determination module that determines that the clock-synchronization packet experienced a delay that exceeds a predetermined threshold during the transfer based at least in part on the item of IP information. Finally, the system may include a discard module that discards the clock-synchronization packet from a set of clock-synchronization packets capable of being used to synchronize the slave device with the master device in response to the determination.

In some examples, the above-described method may be encoded as computer-readable instructions on a non-transitory computer-readable medium. For example, a computer-readable medium may include one or more computer-executable instructions that, when executed by at least one processor of a slave device, cause the slave device to receive at least one clock-synchronization packet from a master device via a network that supports an IP. The computer-readable instructions may also cause the slave device to identify at least one item of IP information added to the clock-synchronization packet during transfer from the master device. The computer-readable instructions may also cause the slave device to determine that the clock-synchronization packet experienced a delay that exceeds a predetermined threshold during the transfer based at least in part on the item of IP information. Finally, the computer-readable instructions may cause the slave device to discard the clock-synchronization packet from a set of clock-synchronization packets capable of being used to synchronize the slave device with the master device in response to the determination.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
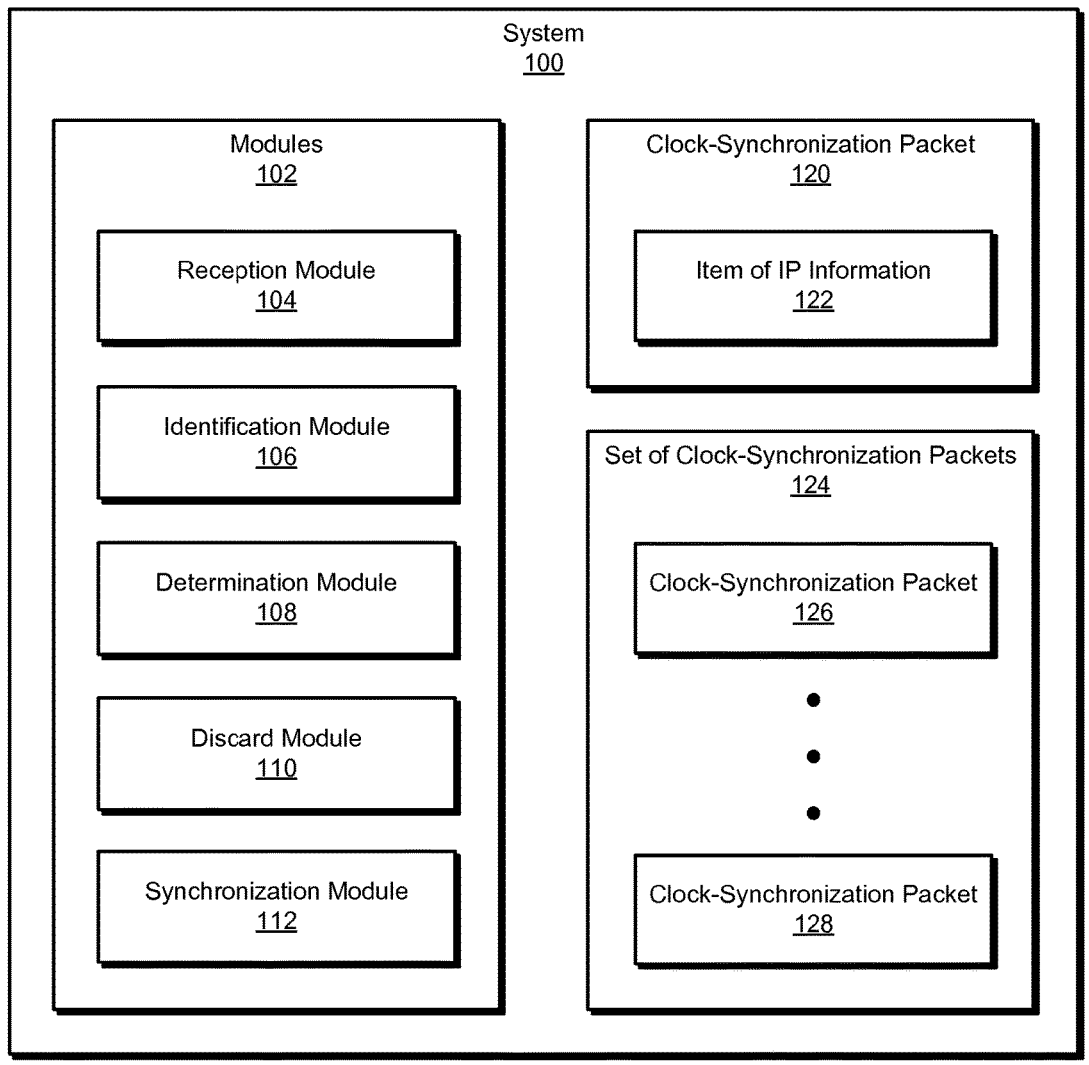
FIG. 1 is a block diagram of an exemplary system for improving clock synchronization between master and slave devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for improving clock synchronization between master and slave devices. As will be explained in greater detail below, by adding certain IP information to clock-synchronization packets transferred from a master device to a slave device, the various systems and methods described herein may use the IP information to determine which clock-synchronization packets experienced a delay that exceeds a predetermined threshold during the transfer. Moreover, by using the IP information to determine which clock-synchronization packets experienced such a delay, the various systems and methods described herein may identify and/or discard overly delayed packets capable of skewing the synchronization offset calculated by the slave device. As a result, these systems and methods may enable the slave device to avoid the degree of inaccuracy that would have otherwise been introduced into the synchronization offset by the overly delayed packets.

The terms "synchronize" and "synchronization," as used herein, generally refer to any type or form of state and/or condition in which the clock of one device and the clock of another device have the same time, phase, and/or frequency. The phrase "Internet Protocol" and the abbreviation "IP," as used herein, generally refer to any type or form of protocol that facilitates routing, relaying, and/or delivering data packets from one computing device to another within a network. Examples of such an IP include, without limitation, IP version 4 (IPv4), IP version 6 (IPv6), Gateway-to-Gateway Protocol, Internet Group Message Protocol (IGMP), Transmission Control Protocol (TCP), combinations of one or more of the same, or any other suitable IP.

Figure 2:
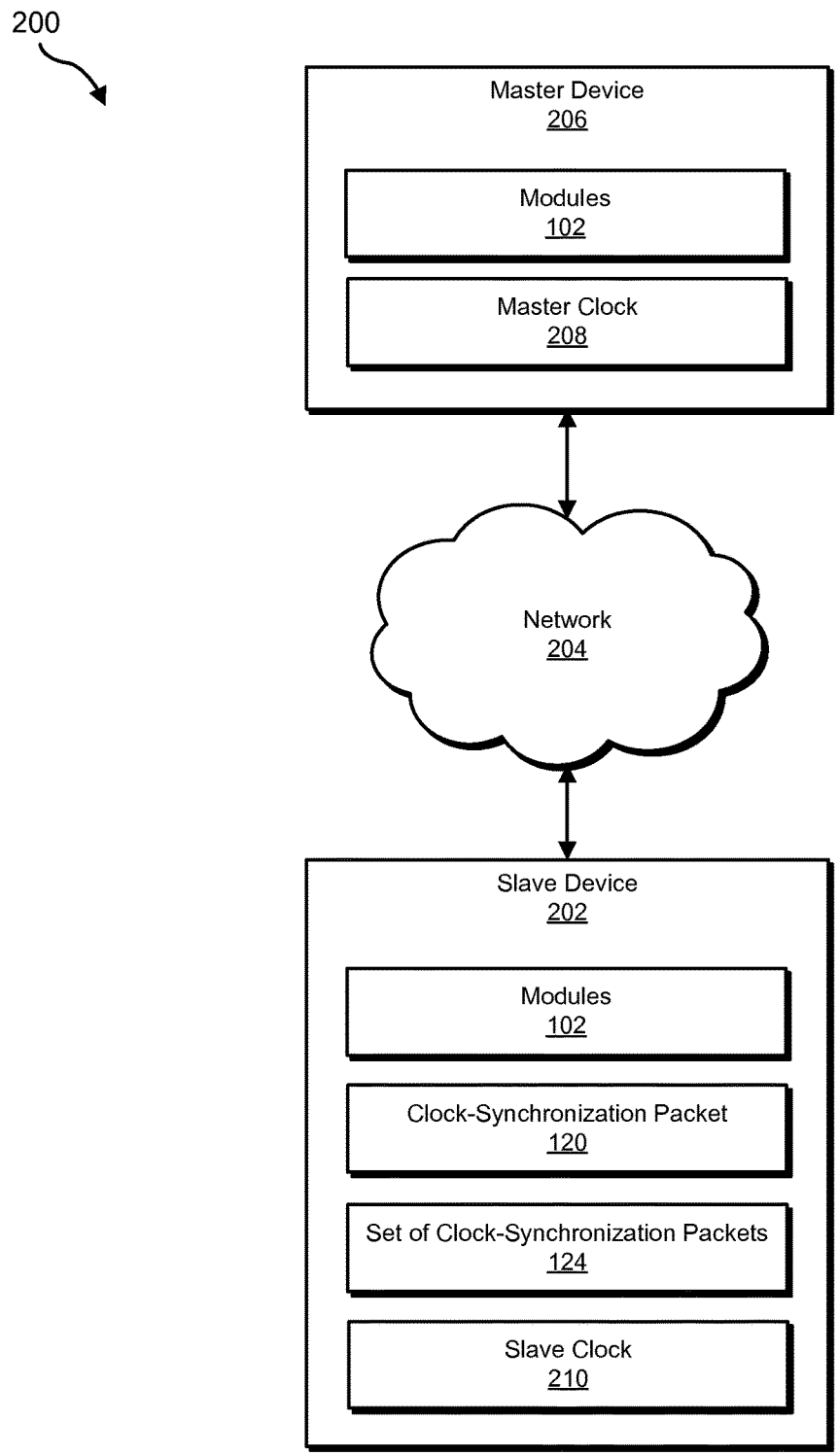
FIG. 2 is a block diagram of an additional exemplary system for improving clock synchronization between master and slave devices.
Figure 4:
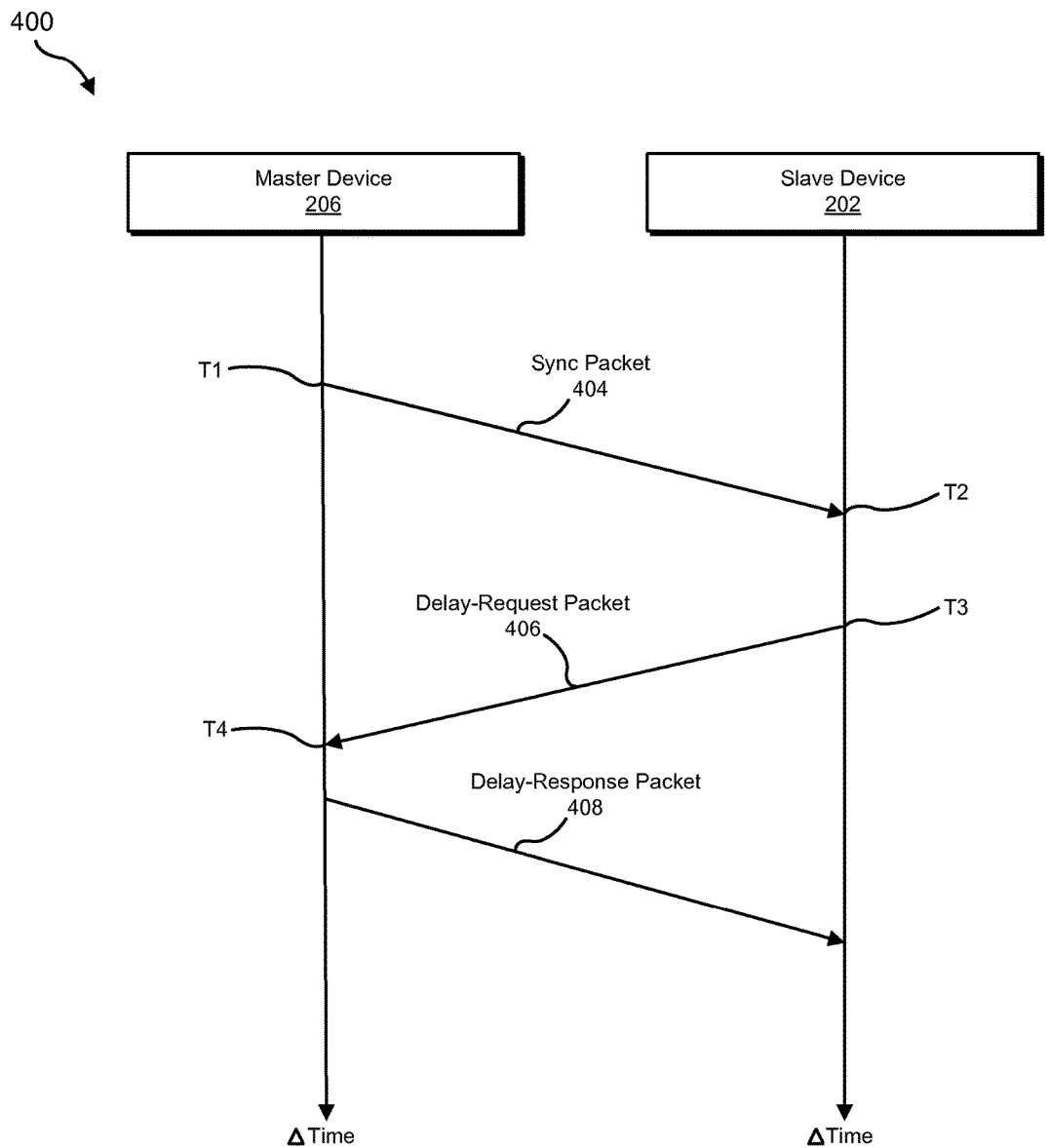
FIG. 4 is a timing diagram of an exemplary packet-exchange sequence performed by master and slave devices.
Figure 5:
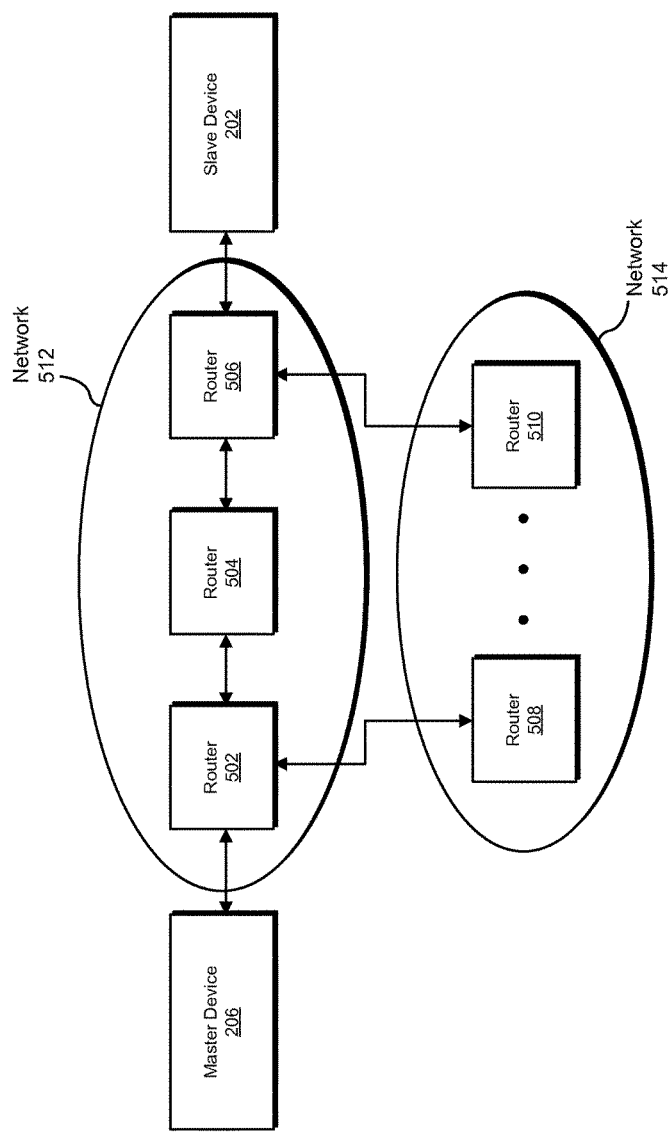
FIG. 5 is a block diagram of an additional exemplary system for improving clock synchronization between master and slave devices.

The following will provide, with reference to FIGS. 1-2 and 5, detailed descriptions of exemplary systems for improving clock synchronization between master and slave devices. Detailed descriptions of corresponding computer-implemented methods will be provided in connection with FIG. 3. Detailed descriptions of an exemplary packet-exchange sequence performed by master and slave devices will be provided in connection with FIG. 4. Detailed descriptions of an exemplary clock-synchronization packet will be provided in connection with FIG. 6. In addition, detailed descriptions of an exemplary computing system capable of implementing one or more of the embodiments described herein will be provided in connection with FIG. 7.

FIG. 1 is a block diagram of an exemplary system 100 for improving clock synchronization between master and slave devices. As illustrated in this figure, exemplary system 100 may include one or more modules 102 for performing one or more tasks. For example, and as will be explained in greater detail below, exemplary system 100 may include a reception module 104 that receives at least one clock-synchronization packet from a master device via a network that supports an IP. Exemplary system 100 may also include an identification module 106 that identifies at least one item of IP information added to the clock-synchronization packet during transfer from the master device.

In addition, and as will be described in greater detail below, exemplary system 100 may include a determination module 108 that determines that the clock-synchronization packet experienced a delay that exceeds a predetermined threshold during the transfer based at least in part on the item of IP information. Exemplary system 100 may further include a discard module 110 that discards the clock-synchronization packet from a set of clock-synchronization packets capable of being used to synchronize a slave device with the master device in response to the determination. Moreover, exemplary system 100 may include a synchronization module 112 that synchronizes the clock of the slave device with the clock of the master device based at least in part on the set of clock-synchronization packets. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., slave device 202 and/or master device 206), the devices illustrated in FIG. 5 (e.g., routers 502, 504, 506, 508, and/or 510), and/or computing system 710 in FIG. 7.

As illustrated in FIG. 1, exemplary system 100 may also include one or more clock-synchronization packets, such as clock-synchronization packets 120, 126, and/or 128. The phrase "clock-synchronization packet," as used herein, generally refers to any type or form of data and/or message that includes time-related information potentially capable of being used to synchronize a slave device with a master device. In one example, clock-synchronization packets 120, 126, and/or 128 may each traverse from a master device (e.g., master device 206 in FIG. 2) to a slave device (e.g., slave device 202 in FIG. 2) via a network (e.g., network 204 in FIG. 2). Examples of clock-synchronization packets 120, 126, and/or 128 include, without limitation, PTP packets, Time Protocol packets, sync packets, delay-request packets, delay-response packets, follow-up packets, combinations of one or more of the same, or any other suitable clock-synchronization packets.

As will be described in greater detail below, clock-synchronization packets 120, 126, and/or 128 may include various information that facilitates synchronization of the slave device and the master device. Examples of such synchronization information include, without limitation, timestamps that identify a packet's time of creation and/or transmission, correction fields that identify an expected forwarding delay experienced by a packet during transmission, residence time values that identify the amount of time that a packet resided at a network router during transmission, combinations of one or more of the same, or any other information potentially capable of facilitating synchronization of a master device and a slave device.

Additionally or alternatively, clock-synchronization packets 120, 126, and/or 128 may include various types of information that enable the slave device to determine whether any of these packets experienced a significant and/or unreasonable delay during transfer from the master device to the slave device. For example, clock-synchronization packet 120 may include item of IP information 122. In this example, item of IP information 122 may enable the slave device to determine whether clock-synchronization packet 120 experienced a delay that exceeds a predetermined threshold during transfer from the master device. Examples of item of IP information 122 include, without limitation, IP information obtained via a network that facilitated transmission of a packet, a Time-To-Live (TTL) value that identifies the number of routers that handled a packet during transmission, a record of the route traversed by a packet during transmission, combinations of one or more of the same, or any other suitable IP information capable of facilitating a determination as to whether a packet experienced a significant and/or unreasonable delay during transmission.

As illustrated in FIG. 1, exemplary system 100 may also include one or more sets of clock-synchronization packets, such as set of clock-synchronization packets 124. In one example, set of clock-synchronization packets 124 may include clock-synchronization packets 126 and 128 (as well as various other clock-synchronization packets not illustrated in FIG. 1). In this example, set of clock-synchronization packets 124 may represent PTP packets that did not experience a significant and/or unreasonable delay during transmission. Accordingly, set of clock-synchronization packets 124 may enable the slave device to fairly accurately calculate the degree to which the master device and the slave device are out of sync with one another.

Exemplary system 100 in FIG. 1 may be implemented in a variety of ways. For example, all or a portion of exemplary system 100 may represent portions of exemplary system 200 in FIG. 2. As shown in FIG. 2, system 200 may include a master device 206 in communication with a slave device 202 via a network 204.

In one example, master device 206 may be programmed with one or more of modules 102. Additionally or alternatively, master device 206 may include a master clock 208. The term "clock," as used herein, generally refers to any type or form of timing mechanism, reference, and/or representation. Examples of master clock 208 include, without limitation, real-time clocks (RTCs), internal clocks, grandmaster clocks, crystal and/or electronic oscillators, combinations of one or more of the same, or any other suitable clock.

In one example, slave device 202 may be programmed with one or more of modules 102. Additionally or alternatively, slave device 202 may include clock-synchronization packet 120, set of clock-synchronization packets 124, and/or slave clock 210. Examples of slave clock 210 include, without limitation, RTCs, internal clocks, crystal and/or electronic oscillators, combinations of one or more of the same, or any other suitable clock.

In one embodiment, one or more of modules 102 from FIG. 1 may, when executed by at least one processor of master device 206 and/or slave device 202, enable master device 206 and/or slave device 202 to improve clock synchronization with one another. For example, and as will be described in greater detail below, reception module 104 may cause slave device 202 to receive clock-synchronization packet 120 from master device 206 via network 204. Identification module 106 may cause slave device 202 to identify at least one item of IP information 122 added to clock-synchronization packet 120 during transfer from master device 206 to slave device 202. Determination module 108 may determine that clock-synchronization packet 120 experienced a delay that exceeds a predetermined threshold during the transfer based at least in part on item of IP information 122. In response to this determination, discard module 110 may discard clock-synchronization packet 120 from set of clock-synchronization packets 124 capable of facilitating synchronization of slave device 202 and master device 206.

Slave device 202 generally represents any type or form of computing device capable of reading computer-executable instructions. Examples of slave device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable slave device.

Master device 206 generally represents any type or form of computing device capable of providing clock-synchronization packets to slave devices via a network. Examples of master device 206 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable master device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an IP network, a PTP network, combinations of one or more of the same, or any other suitable network. Network 204 may facilitate communication or data transfer between master device 206 and slave device 202 using wireless or wired connections. Additionally or alternatively, network 204 may support at least one IP and/or PTP.

Figure 3:
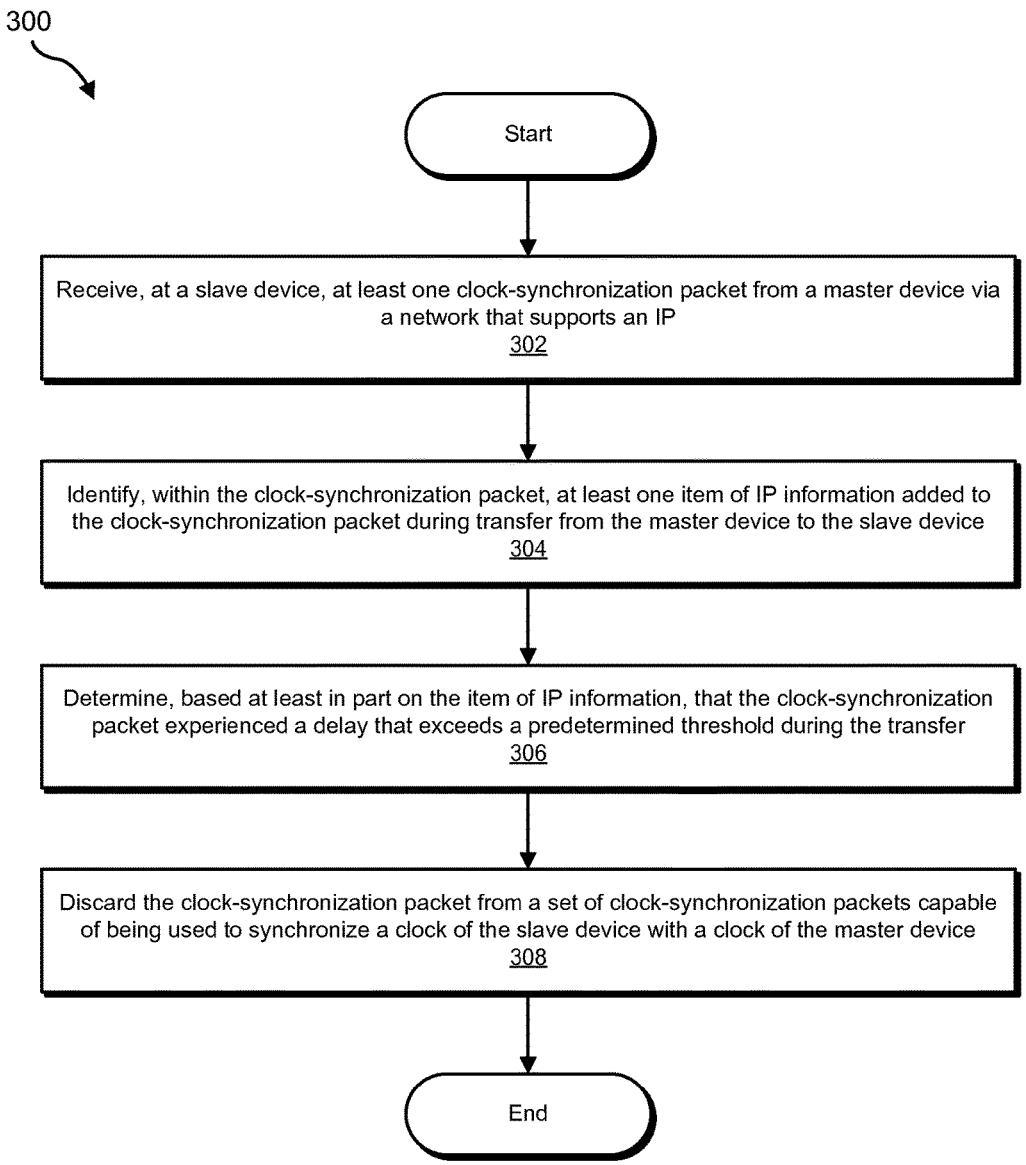
FIG. 3 is a flow diagram of an exemplary method for improving clock synchronization between master and slave devices.

FIG. 3 is a flow diagram of an exemplary computer-implemented method 300 for improving clock synchronization between master and slave devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 710 in FIG. 7.

As illustrated in FIG. 3, at step 302 one or more of the systems described herein may receive at least one clock-synchronization packet transferred from a master device to a slave device via a network that supports an IP. For example, reception module 104 may, as part of slave device 202 in FIG. 2, receive clock-synchronization packet 120 from master device 206 via network 204. In this example, network 204 may support at least one IP and/or PTP.

The systems described herein may perform step 302 in a variety of ways. In some examples, reception module 104 may receive clock-synchronization packet 120 via an IP transport layer of network 204. For example, master device 206 may send clock-synchronization packet 120 to slave device 202 via the IPv4 or IPv6 transport layer of network 204. As clock-synchronization packet 120 reaches slave device 202 via this IPv4 or IPv6 transport layer, reception module 104 may receive clock-synchronization packet 120.

In some examples, reception module 104 may receive clock-synchronization packet 120 during a realignment interval. The phrase "realignment interval," as used herein, generally refers to any type or form of time period during which a slave device collects clock-synchronization packets from a master device. For example, master device 206 may initiate 60 packet-exchange sequences per second during a 2-minute realignment interval. The phrase "packet-exchange sequence," as used herein, generally refers to any type or form of transaction and/or sequence in which a master device and a slave device exchange at least one clock-synchronization packet. In this example, master device 206 may send clock-synchronization packet 120 to slave device 202 as part of at least one of these packet-exchange sequences initiated during the 2-minute realignment interval. As clock-synchronization packet 120 reaches slave device 202 as part of at least one of these packet-exchange sequences, reception module 104 may receive clock-synchronization packet 120.

FIG. 4 is a timing diagram of an exemplary packet-exchange sequence 400 between a master device and a slave device. As illustrated in FIG. 4, master device 206 may initiate packet-exchange sequence 400 by sending a sync packet 404 to slave device 202 at time T1. Sync packet 404 may include a timestamp that identifies T1 as the time at which master device 206 sent sync packet 404 to slave device 202.

Slave device 202 may then receive sync packet 404 from master device 206 at time T2. Slave device 202 may also record T2 as the time at which slave device 202 received sync packet 404 from master device 206.

Upon receiving sync packet 404, slave device 202 may send a delay-request packet 406 to master device 206 at time T3. Slave device 202 may also record T3 as the time at which slave device 202 sent delay-request packet 406 to master device 206.

Master device 206 may then receive delay-request packet 406 from slave device 202 at time T4. Master device 206 may also record T4 as the time at which master device 206 received delay-request packet 406 from slave device 202. In response to receiving delay-request packet 406, master device 206 may send delay-response packet 408 to slave device 202. Delay-response packet 408 may include a timestamp that identifies T4 as the time that master device 206 received delay-request packet 406 from slave device 202.

Slave device 202 may then receive delay-response packet 408 from master device 206. Slave device 202 may complete packet-exchange sequence 400 upon receiving delay-response packet 408. As will be described in greater detail below, slave device 202 may use times T1, T2, T3, and T4 from one or more packet-exchange sequences performed during the realignment interval to calculate the degree to which master device 206 and slave device 202 are out of sync with one another.

In one embodiment, clock-synchronization packet 120 may represent sync packet 404 transferred from master device 206 to slave device 202 as part of packet-exchange sequence 400 in FIG. 4. Additionally or alternatively, clock-synchronization packet 120 may represent delay-response packet 408 transferred from master device 206 to slave device 202 as part of packet-exchange sequence 400 in FIG. 4.

During the realignment interval, some clock-synchronization packets may traverse from master device 206 to slave device 202 via a network 512 in FIG. 5 that supports transparent clocking. The phrase "transparent clocking," as used herein, generally refers to any type or form of time-correction mechanism that modifies a packet to account for the amount of time (sometimes referred to as "residence time" and captured as part of the packet's correction field) that the packet resided at a network's routers during transfer from a master device to a slave device. This residence time may represent an expected forwarding delay experienced by the clock-synchronization packets during the transfer from master device 206 to slave device 202.

As illustrated in FIG. 5, network 512 may include routers 502, 504, and 506. Accordingly, while traversing from master device 206 to slave device 202, some clock-synchronization packets may pass through routers 502, 504, and 506. Each of routers 502, 504, and 506 may modify these clock-synchronization packets to account for the amount of time that the packets resided at the routers during transfer from master device 206 to slave device 202. Routers 502, 504, and 506 may account for this amount of time by adding, modifying, and/or updating corresponding residence time values to a correction field included in the clock-synchronization packets.

In some examples, clock synchronization packet 120 may traverse from master device 206 to slave device 202 via a network 514 in FIG. 5 that does not support transparent clocking. As illustrated in FIG. 5, network 514 may include at least routers 508 and 510. Accordingly, while traversing from master device 206 to slave device 202, clock-synchronization packet 120 may pass through routers 502, 508, 510, and 506. Since, in this example, routers 502 and 506 represent a portion of network 512 that supports transparent clocking, routers 502 and 506 may modify clock-synchronization packet 120 to account for the amount of time that clock-synchronization packet 120 resided at these routers during the transfer from master device 206 to slave device 202. However, since routers 508 and 510 represent a portion of network 514 that does not support transparent clocking, routers 508 and 510 may fail to modify clock-synchronization packet 120 to account for the amount of time that clock-synchronization packet 120 resided at these routers during the transfer from master device 206 to slave device 202.

In one embodiment, clock-synchronization packet 120 may be diverted from network 512 to network 514 due at least in part to a security threat. For example, a BGP route injection attack may target router 502 included in network 512. In this example, the BGP route injection attack may cause router 502 to divert the route traversed by clock-synchronization packet 120 on the way to slave device 202. In other words, the BGP route injection attack may cause router 502 to forward clock-synchronization packet 120 to router 508 included in network 514 instead of forwarding clock-synchronization packet 120 to router 504 included in network 512.

In another embodiment, clock-synchronization packet 120 may be diverted from network 512 to network 514 due at least in part to a failure within network 512. For example, router 504 may experience a failure that prevents clock-synchronization packet 120 from passing through router 504 on the way to slave device 202. As a result of this failure, router 502 may redirect the route traversed by clock-synchronization packet 120 on the way to slave device 202. In other words, router 502 may forward clock-synchronization packet 120 to router 508 included in network 514 instead of forwarding clock-synchronization packet 120 to router 504 included in network 512.

In one embodiment, network 512 and/or network 514 in FIG. 5 may represent a portion of network 204 in FIG. 2. For example, network 512 may represent a portion of network 204 that is known to master device 206 and/or slave device 202. Additionally or alternatively, network 514 may represent a portion of network 204 that is unknown to master device 206 and/or slave device 202.

As illustrated in FIG. 3, at step 304 one or more of the systems described herein may identify at least one item of IP information added to the clock-synchronization packet during the transfer from the master device to the slave device.

For example, identification module 106 may, as part of slave device 202 in FIG. 2, identify item of IP information 122 added to clock-synchronization packet 120 during the transfer from master device 206 to slave device 202. In this example, item of IP information 122 may include a TTL value used to determine the number of routers that handled clock-synchronization packet 120 during the transfer. Additionally or alternatively, item of IP information 122 may include a record of the route traversed by clock-synchronization packet 120 during the transfer.

The systems described herein may perform step 304 in a variety of ways. In some examples, identification module 106 may search clock-synchronization packet 120 for any IP information added to clock-synchronization packet 120 during the transfer from master device 206 to slave device 202. For example, identification module 106 may search clock-synchronization packet 120 for an IP header. During this search, identification module 106 may identify the IP header of clock-synchronization packet 120. Identification module 106 may then identify item of IP information 122 within the IP header of clock-synchronization packet 120.

Figure 6:
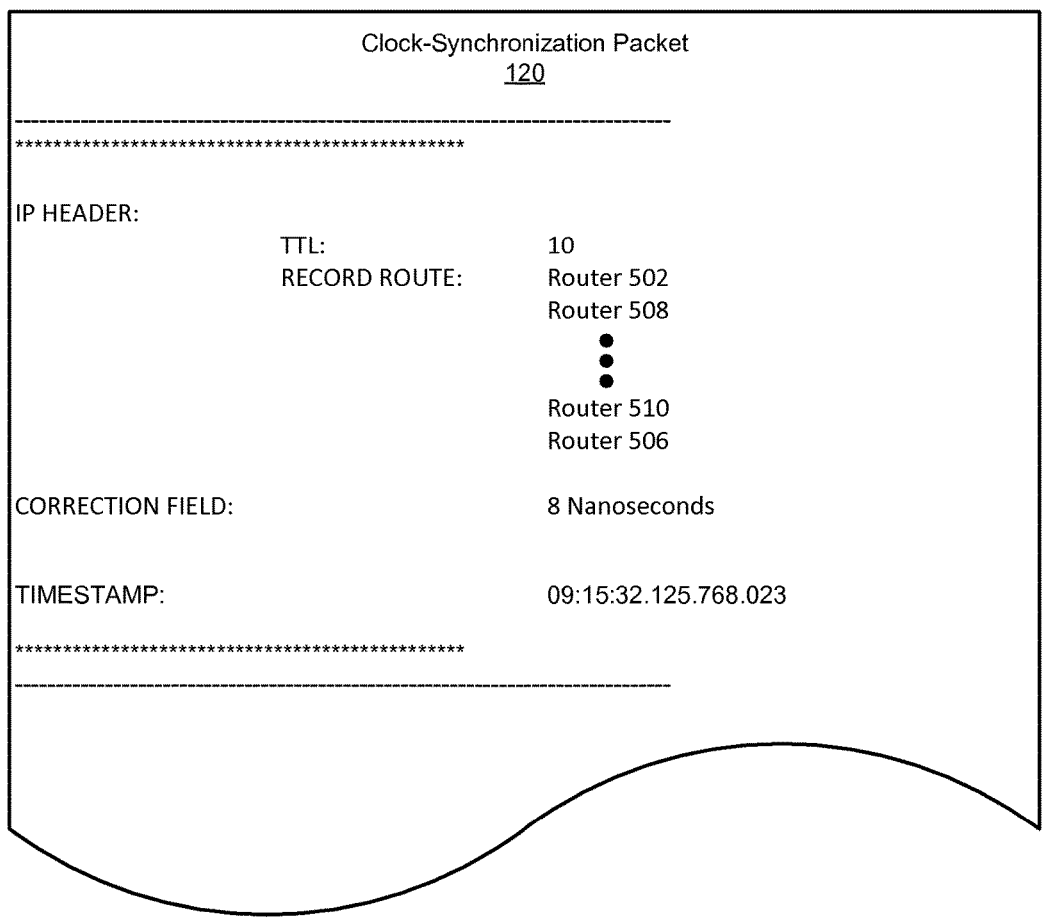
FIG. 6 is an illustration of an exemplary clock-synchronization packet.

As illustrated in FIG. 6, clock-synchronization packet 120 may include an IP header that identifies a TTL value (in this example, "10") and/or a record of the packet's route (in this example, "Router 502," "Router 508," "Router 510," "Router 506," and potentially other routers not illustrated in FIG. 5), a correction field that identifies a residence time value (in this example, "8 nanoseconds"), and/or a timestamp that identifies the particular point in time that the master device initiated transmission of the packet (in this example, "09:15:32.125.768.023," which corresponds to [hours]: [minutes]: [seconds].[milliseconds]. [microseconds].[nanoseconds]).

In one embodiment, item of IP information 122 may include the TTL value identified in the IP header of clock-synchronization packet 120 in FIG. 6. Additionally or alternatively, item of IP information 122 may include the record of the route of clock-synchronization packet 120 identified in the IP header of clock-synchronization packet 120 in FIG. 6.

In some examples, item of IP information 122 may have been added to clock-synchronization packet 120 during the transfer from master device 206 to slave device 202. For example, master device 206 may initialize a TTL value of 64 within the IP header of clock-synchronization packet 120. Additionally or alternatively, master device 206 may configure the record route option within the IP header of clock-synchronization packet 120. Master device 206 may then transfer clock-synchronization packet 120 to router 502 on the way to slave device 202.

Upon receiving clock-synchronization packet 120, router 502 may modify and/or update clock-synchronization packet 120 based at least in part on the IP header of clock-synchronization packet 120. For example, router 502 may decrement the TTL value from 64 to 63 within the IP header of synchronization packet 120. Additionally or alternatively, router 502 may add its own IP address to the route being recorded within the IP header of synchronization packet 120. Router 502 may then transfer clock-synchronization packet 120 to router 508 on the way to slave device 202.

Upon receiving clock-synchronization packet 120, router 508 may further modify and/or update clock-synchronization packet 120 based at least in part on the IP header of clock-synchronization packet 120. For example, router 508 may decrement the TTL value from 63 to 62 within the IP header of synchronization packet 120. Additionally or alternatively, router 508 may add its own IP address to the route being recorded within the IP header of synchronization packet 120. Router 508 may then transfer clock-synchronization packet 120 to the subsequent router within network 514 on the way to slave device 202. Each subsequent router that handles clock-synchronization packet 120 on the way to slave device 202 may continue to modify and/or update clock-synchronization packet 120 in this manner.

As illustrated in FIG. 3, at step 306 one or more of the systems described herein may determine that the clock-synchronization packet experienced a delay that exceeds a predetermined threshold during the transfer based at least in part on the item of IP information. For example, determination module 108 may, as part of slave device 202 in FIG. 2, determine that clock-synchronization packet 120 experienced a delay that exceeds a predetermined threshold during the transfer from master device 206 to slave device 202. In this example, determination module 108 may base this determination at least in part on item of IP information 122 identified within clock-synchronization packet 120.

In some embodiments, this predetermined threshold may represent a fixed reference value. In other embodiments, this predetermined threshold may represent a reference value that evolves and/or varies over a period of time based at least in part on one or more clock-synchronization packets exchanged between master device 206 and slave device 202 during the current realignment interval and/or a previous realignment interval.

The systems described herein may perform step 306 in a variety of ways. In some examples, determination module 108 may determine that clock-synchronization packet 120 experienced the delay based at least in part on at least one variation between item of IP information 122 and a corresponding item of IP information identified within a preceding clock-synchronization packet. In one example, determination module 108 may determine that clock-synchronization packet 120 experienced the delay due at least in part to the number of routers that handled clock-synchronization packet 120 during the transfer from master device 206 to slave device 202. For example, determination module 108 may calculate the number of routers that handled clock-synchronization packet 120 based at least in part on the TTL value included in clock-synchronization packet 120.

In this example, determination module 108 may know that master device 206 initialized the TTL value to 64 prior to initiating transmission of clock-synchronization packet 120. Determination module 108 may also know that each router that handled clock-synchronization packet 120 during the transfer decremented the TTL value by one unit.

With this knowledge, determination module 108 may calculate the number of routers that handled clock-synchronization packet 120 by subtracting the final TTL value identified at slave device 202 from the original TTL value initialized at master device 206. For example, determination module 108 may subtract the final TTL value of 10 identified within clock-synchronization packet 120 in FIG. 6 from the original TTL value of 64. This subtraction may yield a difference of 54 units. Determination module 108 may then determine that 54 routers handled clock-synchronization packet 120 during the transfer from master device 206 to slave device 202 based at least in part on this subtraction.

In one example, determination module 108 may compare the number of routers that handled clock-synchronization packet 120 with the number of routers that handled one or more other clock-synchronization packets collected by slave device 202 during the current realignment interval and/or a previous realignment interval. For example, determination module 108 may identify at least one clock-synchronization packet that preceded clock-synchronization packet 120. In this example, determination module 108 may determine that the preceding clock-synchronization packet traversed only 3 routers during the transfer from master device 206 to slave device 202.

Determination module 108 may then compare the 54 routers traversed by clock-synchronization packet 120 with the 3 routers traversed by the preceding clock-synchronization packet. Upon performing this comparison, determination module 108 may determine that the varying number of routers indicates and/or suggests that clock-synchronization packet 120 experienced the delay.

In some examples, determination module 108 may determine that clock-synchronization packet 120 experienced the delay due at least in part to the route traversed by clock-synchronization packet 120 during the transfer from master device 206 to slave device 202. In one example, determination module 108 may determine that clock-synchronization packet 120 traversed an unknown route based at least in part on the route recorded within clock-synchronization packet 120. For example, determination module 108 may identify routers 502, 508, 510, and 506 in the route recorded within clock-synchronization packet 120 in FIG. 6. In this example, determination module 108 may also identify one or more other routers (not listed in FIG. 6) in the route recorded within clock-synchronization packet 120.

Upon identifying these routers in the route recorded within clock-synchronization packet 120, determination module 108 may compare these routers with the routers that handled one or more other clock-synchronization packets collected by slave device 202 during the current realignment interval and/or a previous realignment interval. For example, determination module 108 may identify at least one clock-synchronization packet that preceded clock-synchronization packet 120. In this example, determination module 108 may determine that the preceding clock-synchronization packet traversed only routers 502, 504, and 506 during the transfer from master device 206 to slave device 202.

Determination module 108 may then compare routers 502, 508, 510, and 506 traversed by clock-synchronization packet 120 with routers 502, 504, and 506 traversed by the preceding clock-synchronization packet. Upon performing this comparison, determination module 108 may determine that the variation between the traversed routes indicates and/or suggests that clock-synchronization packet 120 experienced the delay.

In some examples, determination module 108 may determine that clock-synchronization packet 120 traversed at least a portion of a network that does not support transparent clocking. In one example, determination module 108 may identify a correction field value that seems unusually low relative to the number of routers traversed by clock-synchronization packet 120 during the transfer from master device 206 to slave device 202. For example, determination module 108 may identify the correction field value of 8 nanoseconds recorded within clock-synchronization packet 120 in FIG. 6. As described above, determination module 108 may also determine that clock-synchronization packet 120 traversed 54 routers based at least in part on the TTL value and/or the record of the route identified within clock-synchronization packet 120 in FIG. 6.

Determination module 108 may then determine that at least a portion of the network traversed by clock-synchronization packet 120 does not support transparent clocking since the correction field value of 8 seems unusually low for a packet that traversed 54 routers during the transfer from master device 206 to slave device 202. Upon determining that the portion of the network does not support transparent clocking, determination module 108 may deem clock-synchronization packet 120 unreliable and/or misleading. As a result, determination module 108 may assume and/or infer that clock-synchronization packet 120 experienced the delay that exceeds the predetermined threshold.

In one embodiment, the delay may exceed the predetermined threshold in the event that item of IP information 122 differs from a corresponding item of IP information identified within one or more other clock-synchronization packets collected by slave device 202 during the current realignment interval and/or a previous realignment interval. For example, the delay may exceed the predetermined threshold in the event that the number of routers traversed by clock-synchronization packet 120 does not match the number of routers traversed by the preceding clock-synchronization packet. Additionally or alternatively, the delay may exceed the predetermined threshold in the event that the record of the route traversed by clock-synchronization packet 120 does not match the record of the route traversed by the preceding clock-synchronization packet. Additionally or alternatively, the delay may exceed the predetermined threshold in the event that clock-synchronization packet 120 traversed an unknown route during the transfer from master device 206 to slave device 202.

In some examples, determination module 108 may also consider the correction field in determining whether the delay experienced by clock-synchronization packet 120 exceeds the predetermined threshold. For example, upon determining that clock-synchronization packet 120 traversed a different route than the preceding clock-synchronization packet, determination module 108 may identify the correction field values 8 nanoseconds included in clock-synchronization packet 120. Determination module 108 may then compare the correction field values of 8 nanoseconds with at least one reference value to determine whether to treat clock-synchronization packet 120 as having experienced the delay that exceeds the predetermined threshold.

Examples of such a reference value include, without limitation, an average of the correction field values identified within clock-synchronization packets collected during one or more previous realignment intervals, the most common and/or frequently occurring correction field value identified within clock-synchronization packets collected during one or more previous realignment intervals, the minimum correction field value identified within clock-synchronization packets collected during one or more previous realignment intervals, combinations of one or more of the same, or any other suitable reference value. In some embodiments, the reference value may be stored and/or maintained at slave device 202.

In one example, determination module 108 may identify the correction field value that occurred most frequently during the preceding realignment interval. For example, determination module 108 may determine that slave device 202 collected 7200 clock-synchronization packets during the preceding realignment interval. In this example, determination module 108 may also determine that 5000 of those 7200 clock-synchronization packets included a correction field value of 12 nanoseconds. Accordingly, determination module 108 may identify 12 nanoseconds as the most frequently occurring correction field value from the preceding realignment interval.

Determination module 108 may then compare the correction field value of 8 nanoseconds identified within clock-synchronization packet 120 with the most frequently occurring correction field value of 12 nanoseconds from the preceding realignment interval. Upon performing this comparison, determination module 108 may deem clock-synchronization packet 120 unreliable and/or misleading since (1) clock-synchronization packet 120 and the preceding clock-synchronization packet did not traverse the same route and (2) the correction field value of 8 nanoseconds does not match the most frequently occurring correction field value of 12 nanoseconds. As a result, determination module 108 may assume and/or infer that clock-synchronization packet 120 experienced the delay that exceeds the predetermined threshold.

In one example, determination module 108 may identify the minimum (sometimes referred to as the "best") correction field value identified within a single clock-synchronization packet collected during the preceding realignment interval. For example, determination module 108 may determine that the best correction field value from the preceding realignment interval equals 10 nanoseconds. Determination module 108 may then compare the correction field value of 8 nanoseconds identified within clock-synchronization packet 120 with the best correction field value of 10 nanoseconds from the preceding realignment interval. Upon performing this comparison, determination module 108 may deem clock-synchronization packet 120 unreliable and/or misleading since (1) clock-synchronization packet 120 and the preceding clock-synchronization packet did not traverse the same route and (2) the correction field value of 8 nanoseconds does not match the best correction field value of 10 nanoseconds. As a result, determination module 108 may assume and/or infer that clock-synchronization packet 120 experienced the delay that exceeds the predetermined threshold.

In one example, determination module 108 may identify the best correction field value from the last 5 realignment intervals. For example, determination module 108 may determine that the best correction field value from the last 5 realignment intervals equals 9 nanoseconds. Determination module 108 may then compare the correction field value of 8 nanoseconds identified within clock-synchronization packet 120 with the best correction field value of 9 nanoseconds from the last 5 realignment intervals. Upon performing this comparison, determination module 108 may deem clock-synchronization packet 120 unreliable and/or misleading since (1) clock-synchronization packet 120 and the preceding clock-synchronization packet did not traverse the same route and (2) the correction field value of 8 nanoseconds does not match the best correction field value of 9 nanoseconds. As a result, determination module 108 may assume and/or infer that clock-synchronization packet 120 experienced the delay that exceeds the predetermined threshold.

As illustrated in FIG. 3, at step 308 one or more of the systems described herein may discard the clock-synchronization packet from a set of clock-synchronization packets capable of being used to synchronize a slave device with the master device in response to the determination. For example, discard module 110 may, as part of slave device 202 in FIG. 2, discard clock-synchronization packet 120 from set of clock-synchronization packets 124 capable of being used to synchronize slave device 202 with master device 206. In this example, discard module 110 may initiate this process of discarding clock-synchronization packet 120 in response to the determination that clock-synchronization packet 120 experienced the delay that exceeds the predetermined threshold.

The systems described herein may perform step 308 in a variety of ways. In some examples, discard module 110 may drop clock-synchronization packet 120 from set of clock-synchronization packets 124 so as to avoid skewing a synchronization offset calculated by slave device 202. The phrase "synchronization offset" and the term "offset," as used herein, generally refer to any type or form of metric and/or value that represents the degree to which master device 206 and slave device 202 are out of sync with one another.

In one example, discard module 110 may refuse to add clock-synchronization packet 120 to set of clock-synchronization packets 124. Additionally or alternatively, discard module 110 may remove clock-synchronization packet 120 from set of clock-synchronization packets 124. By doing so, discard module 110 may enable slave device 202 to avoid the degree of inaccuracy that would have otherwise been introduced into the synchronization offset by clock-synchronization packet 120.

In one embodiment, reception module 104 may receive clock-synchronization packets 126 and 128 at slave device 202 during the same realignment interval as clock-synchronization packet 120. However, determination module 108 may determine that (contrary to clock-synchronization packet 120) clock-synchronization packets 126 and 128 did not experience a delay that exceeds the predetermined threshold. As a result, discard module 110 may allow slave device 202 to add clock-synchronization packets 126 and 128 to set of clock-synchronization packets 124. Upon adding clock-synchronization packets 126 and 128 to set of clock-synchronization packets 124, slave device 202 may be able to use set of clock-synchronization packets 124 to fairly accurately calculate the degree to which master device 206 and slave device 202 are out of sync with one another.

In some examples, one or more of the systems described herein may synchronize slave clock 210 with master clock 208 based at least in part on set of clock-synchronization packets 124. In one example, synchronization module 112 may, as part of slave device 202 in FIG. 2, calculate a synchronization offset that represents the degree to which master clock 208 and slave clock 210 are out of sync with one another based at least in part on set of clock-synchronization packets 124. For example, returning to FIG. 4, synchronization module 112 may identify times T1, T2, T3, and T4 from each of the packet-exchange sequences in which master device 206 and slave device 202 exchanged set of clock-synchronization packets 124. Synchronization module 112 may then calculate the synchronization offset for each of the packet-exchange sequences by applying these times to equation [(T2−T1)−(T4−T3)]÷2.

Upon calculating the synchronization offset for each of the packet-exchange sequences, synchronization module 112 may calculate an average of all of the synchronization offsets. Synchronization module 112 may then apply this average synchronization offset to slave clock 210. By applying the average synchronization offset to slave clock 210, synchronization module 112 may be able to fairly accurately synchronize slave clock 210 with master clock 208.

In other examples, synchronization module 112 may refuse to synchronize slave clock 210 with master clock 208 based on set of clock-synchronization packets 124. For example, synchronization module 112 may detect an ending of the 2-minute realignment interval. In this example, synchronization module 112 may determine that slave device 202 received 7200 clock-synchronization packets during this 2-minute realignment interval.

In one example, synchronization module 112 may calculate the number of packets included in set of clock-synchronization packets 124 at the end of the realignment interval. For example, synchronization module 112 may determine that set of clock-synchronization packets 124 includes only 3000 of the 7200 clock-synchronization packets received during the 2-minute realignment interval. In other words, synchronization module 112 may determine that 4200 of the 7200 clock-synchronization packets were discarded due at least in part to having experienced a delay that exceeds the predetermined threshold. Synchronization module 112 may then determine that the 3000 packets included in set of clock-synchronization packets 124 is below a predetermined threshold. In response to this determination, synchronization module 112 may refuse to synchronize slave clock 210 with master clock 208 based on set of clock-synchronization packets 124.

As explained above in connection with method 300 in FIG. 3, a master device and at least one slave device may attempt to synchronize their clocks with one another. For example, the master device may send various PTP packets to the slave device over a network that supports transparent clocking during a realignment interval. Unfortunately, this network may have certain vulnerabilities that leave the network exposed to a BGP route injection attack. As a result of the BGP route injection attack, one or more of the network's routers may divert some of these PTP packets to an unknown network that does not support transparent clocking on the way to the slave device.

In an effort to prevent these diverted PTP packets from introducing unwanted inaccuracy into the slave device's synchronization attempt, the master device may configure the PTP packets to carry certain IP information to the slave device. For example, the master device may configure an IP header of the PTP packets to carry a TTL value and/or a record of the route traversed by the PTP packets on the way to the slave device. As the PTP packets reach the network's routers on the way to the slave device, the routers may add the corresponding IP information to the PTP packets and/or update the IP information within the PTP packets.

Upon receiving the PTP packets during the realignment interval, the slave device may use the IP information carried by the PTP packets to identify any packets that were diverted by the BGP route injection attack. For example, the slave device may compare the IP information carried by the PTP packets with trusted IP information carried by PTP packets collected during a previous realignment interval. The slave device may then discard any of the PTP packets whose IP information does not match the trusted IP information during this comparison. By discarding these PTP packets, the slave device may be able to calculate a synchronization offset that fairly accurately represents the degree to which the master device and the slave device are out of sync with respect to time, phase, and/or frequency.

Figure 7:
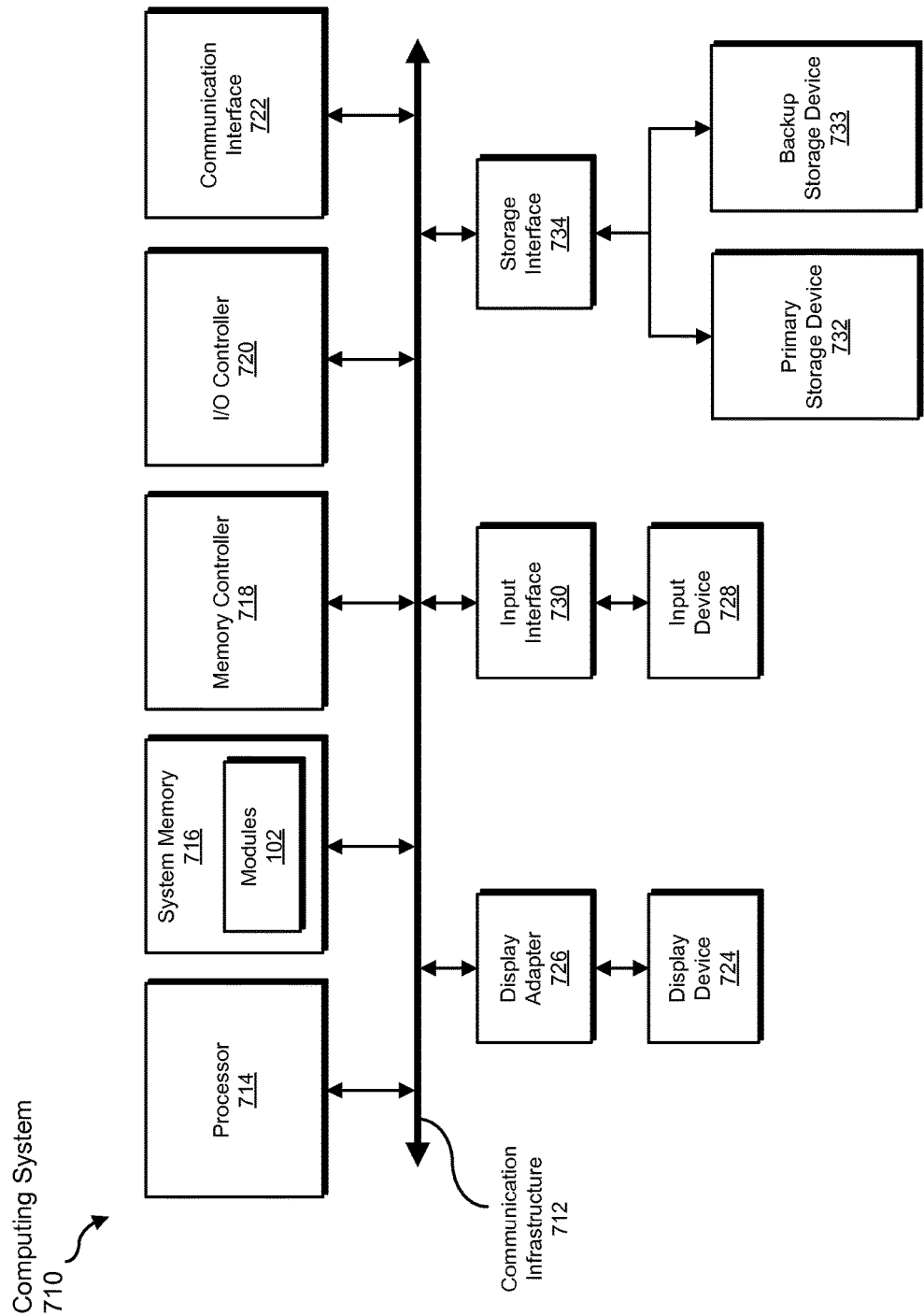
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. Processor 714 may represent an application-specific integrated circuit (ASIC), a system on a chip (e.g., a network processor), a hardware accelerator, a general purpose processor, and/or any other suitable processing element.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

As detailed above, computing system 710 may perform and/or be a means for performing, either alone or in combination with other elements, one or more steps of an exemplary method for improving clock synchronization between master and slave devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive clock-synchronization packets to be transformed, transform the clock-synchronization packets, output a result of the transformation to facilitate determining whether the clock-synchronization packets experienced a delay that exceeds a predetermined threshold, use the result of the transformation to improve clock synchronization between master and slave devices, and store the result of the transformation for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving clock synchronization between master and slave devices, at least a portion of the method being performed by a computing device comprising at least one processor, the method comprising:
   receiving, at a slave device, at least one clock-synchronization packet from a master device via a network that supports an Internet Protocol (IP), the clock-synchronization packet having been diverted by a security threat from a network that supports transparent clocking to another network that does not support transparent clocking during transfer from the master device to the slave device;
   identifying, within the clock-synchronization packet, at least one additional item of IP information added to the clock-synchronization packet by a router that represents a portion of a route traversed by the clock-synchronization packet during the transfer from the master device to the slave device, the router being a device that is separate from the master device and the slave device;
   determining, based at least in part on the additional item of IP information identified within the clock-synchronization packet, that the clock-synchronization packet experienced a delay that exceeds a predetermined threshold during the transfer from the master device to the slave device; and
   in response to determining that the clock-synchronization packet experienced the delay during the transfer, discarding the clock-synchronization packet from a set of clock-synchronization packets capable of being used to synchronize a clock of the slave device with a clock of the master device.

2. The method of claim 1, wherein the additional item of IP information comprises at least one of:
   a time-to-live value obtained via the network; and
   a record of the route traversed by the clock-synchronization packet and recorded via a record route option of the IP supported by the network.

3. The method of claim 1, further comprising synchronizing the clock of the slave device with the clock of the master device based at least in part on the set of clock-synchronization packets.

4. The method of claim 3, wherein synchronizing the clock of the slave device with the clock of the master device comprises:
   calculating an offset between the clock of the slave device and the clock of the master device based at least in part on the set of clock-synchronization packets; and
   upon calculating the offset between the clock of the slave device and the clock of the master device, applying the offset to the clock of the slave device.

5. The method of claim 1, wherein receiving the clock-synchronization packet from the master device via the network comprises receiving the clock-synchronization packet during a realignment interval in which the slave device collects the set of clock-synchronization packets.

6. The method of claim 5, further comprising:
   detecting an ending of the realignment interval;
   upon detecting the ending of the realignment interval:
      calculating the number of packets that are included in the set of clock-synchronization packets; and
      determining that the number of packets included in the set of clock-synchronization packets is below a predetermined threshold; and
   in response to determining that the number of packets is below the predetermined threshold, refusing to synchronize the clock of the slave device based on the set of clock-synchronization packets.

7. The method of claim 1, wherein determining that the clock-synchronization packet experienced the delay comprises:
   comparing the additional item of IP information identified within the clock-synchronization packet with at least one corresponding item of IP information identified within the set of clock-synchronization packets;
   identifying, based at least in part on the comparison, at least one variation between the additional item of IP information identified within the clock-synchronization packet and the corresponding item of IP information identified within the set of clock-synchronization packets; and
   determining, based at least in part on the identified variation, that the clock-synchronization packet experienced the delay.

8. The method of claim 1, wherein determining that the clock-synchronization packet experienced the delay comprises:

identifying, within the clock-synchronization packet, at least one correction field value that accounts for an expected forwarding delay experienced by the clock-synchronization packet during the transfer from the master device to the slave device;

comparing the correction field value identified within the clock-synchronization packet with at least one reference value; and determining, based at least in part on the comparison of the correction field value and the reference value, that the clock-synchronization packet experienced the delay.

9. The method of claim 8, wherein the reference value comprises at least one of:

a minimum correction field value identified by the slave device within a predetermined amount of time; and an average of correction field values identified by the slave device within a predetermined amount of time.

10. The method of claim 1, further comprising identifying, within the clock-synchronization packet, at least one correction field value that accounts for an expected forwarding delay experienced by the clock-synchronization packet during the transfer from the master device to the slave device; and wherein determining that the clock-synchronization packet experienced the delay comprises determining, based at least in part on the correction field value and the additional item of IP information identified within the clock-synchronization packet, that the clock-synchronization packet experienced the delay.

11. A system for improving clock synchronization between master and slave devices, the system comprising:

a reception module, stored in memory, that receives, at a slave device, at least one clock-synchronization packet from a master device via a network that supports an IP, the clock-synchronization packet having been diverted by a security threat from a network that supports transparent clocking to another network that does not support transparent clocking during transfer from the master device to the slave device;

an identification module, stored in memory, that identifies, within the clock-synchronization packet, at least one additional item of IP information added to the clock-synchronization packet by a router that represents a portion of a route traversed by the clock-synchronization packet during transfer from the master device to the slave device, the router being a device that is separate from the master device and the slave device;

a determination module, stored in memory, that determines, based at least in part on the additional item of IP information identified within the clock-synchronization packet, that the clock-synchronization packet experienced a delay that exceeds a predetermined threshold during the transfer from the master device to the slave device;

a discard module, stored in memory, that discards, in response to the determination that the clock-synchronization packet experienced the delay, the clock-synchronization packet from a set of clock-synchronization packets capable of being used to synchronize a clock of the slave device with a clock of the master device; and at least one physical processor configured to execute the reception module, identification module, the determination module, and the discard module.

12. The system of claim 11, wherein the additional item of IP information comprises at least one of:

a time-to-live value obtained via the IP supported by the network; and a record of the route traversed by the clock-synchronization packet and recorded via a record route option of the IP supported by the network.

13. The system of claim 11, further comprising a synchronization module that synchronizes the clock of the slave device with the clock of the master device based at least in part on the set of clock-synchronization packets.

14. The system of claim 13, wherein the synchronization module further:

calculates an offset between the clock of the slave device and the clock of the master device based at least in part on the set of clock-synchronization packets; and applies the offset to the clock of the slave device.

15. The system of claim 11, wherein the reception module further receives the clock-synchronization packet during a realignment interval in which the slave device collects the set of clock-synchronization packets.

16. The system of claim 15, further comprising a synchronization module that:

detects an ending of the realignment interval;

upon detecting the ending of the realignment interval:

calculates the number of packets included in the set of clock-synchronization packets; and determines that the number of packets included in the set of clock-synchronization packets is below a predetermined threshold; and in response to determining that the number of packets is below the predetermined threshold, refuses to synchronize the clock of the slave device based on the set of clock-synchronization packets.

17. The system of claim 11, wherein the determination module further:

compares the additional item of IP information identified within the clock-synchronization packet with at least one corresponding item of IP information identified within the set of clock-synchronization packets;

identifies, based at least in part on the comparison, at least one variation between the additional item of IP information identified within the clock-synchronization packet and the corresponding item of IP information identified within the set of clock-synchronization packets; and determines, based at least in part on the identified variation, that the clock-synchronization packet experienced the delay.

18. The system of claim 11, wherein the determination module further:

identifies, within the clock-synchronization packet, at least one correction field value that accounts for an expected forwarding delay experienced by the clock-synchronization packet during the transfer from the master device to the slave device;

compares the correction field value identified within the clock-synchronization packet with at least one reference value; and determines, based at least in part on the comparison of the correction field value and the reference value, that the clock-synchronization packet experienced the delay.

19. The system of claim 18, wherein the reference value comprises at least one of:

a minimum correction field value identified by the slave device within a predetermined amount of time; and an average of correction field values identified by the slave device within a predetermined amount of time.

20. A non-transitory computer-readable medium comprising one or more computer-executable instructions that, when executed by at least one processor of a slave device, cause the slave device to:
- receive at least one clock-synchronization packet from a master device via a network that supports an IP, the clock-synchronization packet having been diverted by a security threat from a network that supports transparent clocking to another network that does not support transparent clocking during transfer from the master device to the slave device;
- identify, within the clock-synchronization packet, at least one additional item of IP information added to the clock-synchronization packet by a router that represents a portion of a route traversed by the clock-synchronization packet during transfer from the master device to the slave device, the router being a device that is separate from the master device and the slave device;
- determine, based at least in part on the additional item of IP information identified within the clock-synchronization packet, that the clock-synchronization packet experienced a delay that exceeds a predetermined threshold during the transfer from the master device to the slave device; and
- discard, in response to the determination that the clock-synchronization packet experienced the delay, the clock-synchronization packet from a set of clock-synchronization packets capable of being used to synchronize a clock of the slave device with a clock of the master device.

* * * * *